(12) United States Patent
Stone et al.

(10) Patent No.: US 6,504,554 B1
(45) Date of Patent: Jan. 7, 2003

(54) DYNAMIC CONVERSION OF OBJECT-ORIENTED PROGRAMS TO TAG-BASED PROCEDURAL CODE

(75) Inventors: Victor A. Stone, Mercer Island, WA (US); Shawn P. Burke, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/144,941

(22) Filed: Sep. 1, 1998

(51) Int. Cl.[7] .................................................. G06F 3/14
(52) U.S. Cl. ........................ 345/760; 345/744; 345/762; 345/764; 345/853; 707/501; 707/513
(58) Field of Search .................................. 345/356, 744, 345/760, 762, 764, 853; 707/501, 513; 395/704, 705, 710

(56) References Cited

U.S. PATENT DOCUMENTS

| | | | |
|---|---|---|---|
| 5,826,242 A | * 10/1998 | Montulli | 705/27 |
| 5,835,712 A | * 11/1998 | DuFresne | 709/203 |
| 5,987,256 A | * 11/1999 | Wu et al. | 395/707 |
| 5,995,975 A | * 11/1999 | Malcolm | 707/103 |
| 6,003,047 A | * 12/1999 | Osmond et al. | 707/513 |
| 6,018,627 A | * 1/2000 | Iyengar et al. | 395/701 |
| 6,035,119 A | * 3/2000 | Massena et al. | 395/701 |
| 6,055,522 A | * 4/2000 | Krishna et al. | 705/517 |
| 6,061,518 A | * 5/2000 | Hoffman | 395/704 |
| 6,061,696 A | * 5/2000 | Lee et al. | 707/513 |
| 6,064,977 A | * 5/2000 | Haverstock et al. | 705/9 |
| 6,065,012 A | * 5/2000 | Balsara et al. | 707/102 |

FOREIGN PATENT DOCUMENTS

WO 9908182 * 2/1919

OTHER PUBLICATIONS

First Look: Interne Explore 5.0: Potential TimeSaver for Web Designer, Software Review, Evaluation Jul. 1998.*

* cited by examiner

Primary Examiner—John Cabeca
Assistant Examiner—Thomas T. Nguyen
(74) Attorney, Agent, or Firm—Woodcock Washburn LLP

(57) ABSTRACT

An HTML package of the Windows foundation classes framework allows Java developers to write Java code normally as if they were writing to any user interface framework. The WFC framework converts their coding into standard HTML for display on an Internet Explorer version 4.0 web browser, a selected browser or generic HTML if so indicated by the developer. The HTML generation process is replaceable with third party generators to specifically target selected browsers with differing capabilities. During code writing key value pairs are maintained in arrays and are used to generate styles and attributes, which are further used to generate HTML. Also, several states are used when the code is being written to manage modification and display of HTML directly on a browser. The states and movement between them are transparent to the programmer because the states are handled internally by the library.

6 Claims, 8 Drawing Sheets

DYNAMIC CONVERSION OF OBJECT-ORIENTED PROGRAMS TO TAG-BASED PROCEDURAL CODE

FIELD OF THE INVENTION

This invention relates generally to object-oriented application development, and more particularly to dynamically generating tag-based code from object-oriented code.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 1997, Microsoft, All Rights Reserved.

BACKGROUND OF THE INVENTION

Internet application development includes techniques and methods that differ from traditional object-oriented application development.

One method of Internet application development utilizes a tag-based display language such as a Hyper Text Markup Language (HTML). However, the static nature of HTML pages makes interactive components for World Wide Web (Web) pages difficult to build and to reuse. Another method of Internet application development utilizes Dynamic HTML (DHTML). DHTML provides for interactive components through a combination of HTML, script code and a document object model. The script code allows web authors to write source code that manipulates items displayed by a web browser.

Object-oriented programming languages, such as the Java programming language, are different from scripting languages. Traditional software developers are frequently more accustomed to using an object-oriented programming model rather than an Internet programming model. In order to develop Internet applications then, traditional software developers must learn a tag-based display language such as DHTML. However, having to learn a new language reduces software development productivity.

Therefore, there is a need for a system that enables object-oriented programmers to generate tag-based procedural code without having to learn a new language. There is also a need for a system that allows software developers to generate Dynamic HTML while writing programs in the Java programming language.

SUMMARY OF THE INVENTION

The above-mentioned shortcomings, disadvantages and problems are addressed by the present invention, which will be understood by reading and studying the following specification. The present invention allows objected oriented programmers, such as those writing in the Java programming language, to write object-oriented code normally as if they were writing to any user interface framework. The present invention converts the code into standard tag-based procedural code, such as HTML or eXtensible Markup Language (XML), for display on a selected Internet web browser or other selected browser and to generate generic HTML if so indicated by the developer.

The programmer creates and manipulates objects that correspond to components of a web page. The objects have an attribute referred as key value pairs. Key value pairs for an object are maintained in arrays and are used to generate styles and attributes, which are further used to generate HTML for desired web browsers. Examples of styles and attributes include color: red, font: bold, etc. The use of the key value pair data structure facilitates the ease of plugging in different HTML generators or other tag-based language generators to perform the conversion in an objected oriented development environment.

In one embodiment, several states are used when Java code is being written for display of HTML directly on a browser to aid in its generation and modification. An "unbound" state is used until HTML for an element is sent to the browser. When the browser has received the element's corresponding HTML, the element internally moves to a "peer available" state. If the element's "peer" interface is retrieved from the browser, the state becomes "bound", which indicates the element is associated with a "peer" inside the browser. During the "bound" state the key value pairs are no longer maintained and any changes in properties or attributes are sent directly to the "peer". In one embodiment, elements are returned from "bound" to "unbound" when elements are removed from the document. The states and movement between them are transparent to the programmer, as they are handled internally by a library or set of development tools.

The present invention describes computers, systems, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system level overview of the invention is presented. In the third section, methods for an exemplary embodiment of the invention are provided. In the fourth section, a particular implementation of one embodiment of the invention is described. Finally, in the fifth section, a conclusion of the detailed description is provided.

Hardware and Operating Environment

Figure 1:
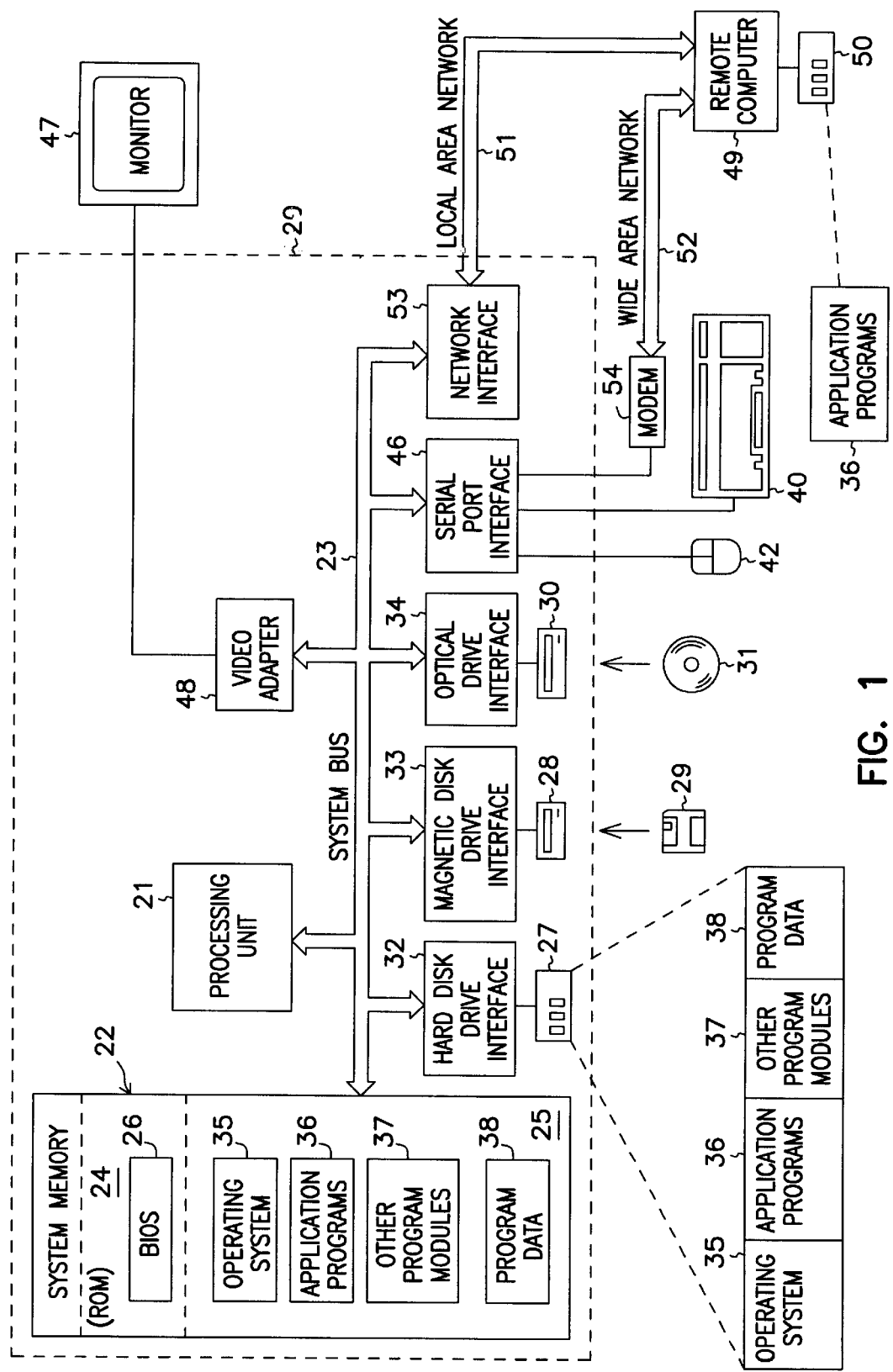
FIG. 1 is a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. a basic input/output system (BIOS) 26, containing the basic routines that help to transfer information between elements within the computer 20, such as during start-up, is stored in ROM 24.

The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

A system level overview of the operation of an exemplary embodiment of the invention is described by reference to FIGS. 2, 3 and 4.

Figure 2:
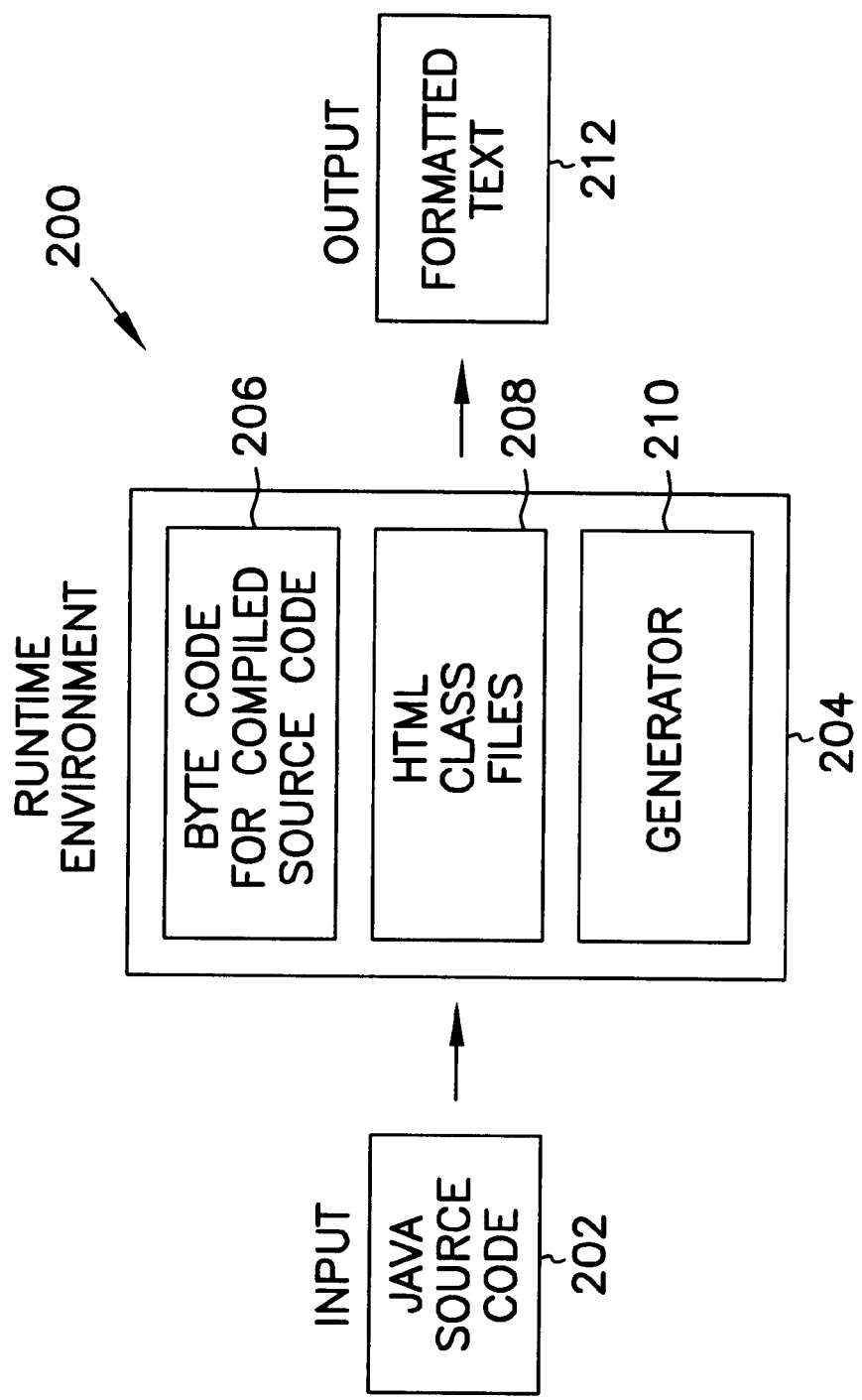
FIG. 2 is a diagram illustrating a system-level overview of an exemplary embodiment of the invention.

A high-level view of a system for generating HTML from Java code 200 is shown in FIG. 2. The system shown in FIG. 2 comprises an input 202, a runtime environment 204 and an output 212. In one embodiment, the input 202 is source code written in the Java programming language. The Java source code is compiled into byte code to be read by the runtime environment 204.

The runtime environment 204 of the present invention provides software developers the ability to translate object-oriented programs into a tag-based display language. The tag-based display language generated from a single program can be tailored to one of many different web browsers. In one embodiment, the runtime environment 204 comprises byte code 206, a plurality of HTML class files 208 and one or more generators 210. The byte code 206 represents the compiled Java source code. The plurality of class files 208 provide functionality enabling software developers to author HTML pages using only the Java language. An example implementation of the class files 208 is described later in the section entitled "Microsoft com.ms.wfc.html Implementation." The generator 210 generates HTML from the Java code. The output 212 is a string of formatted text, such as HTML, that is tailored to one of several different browsers.

Figure 3:
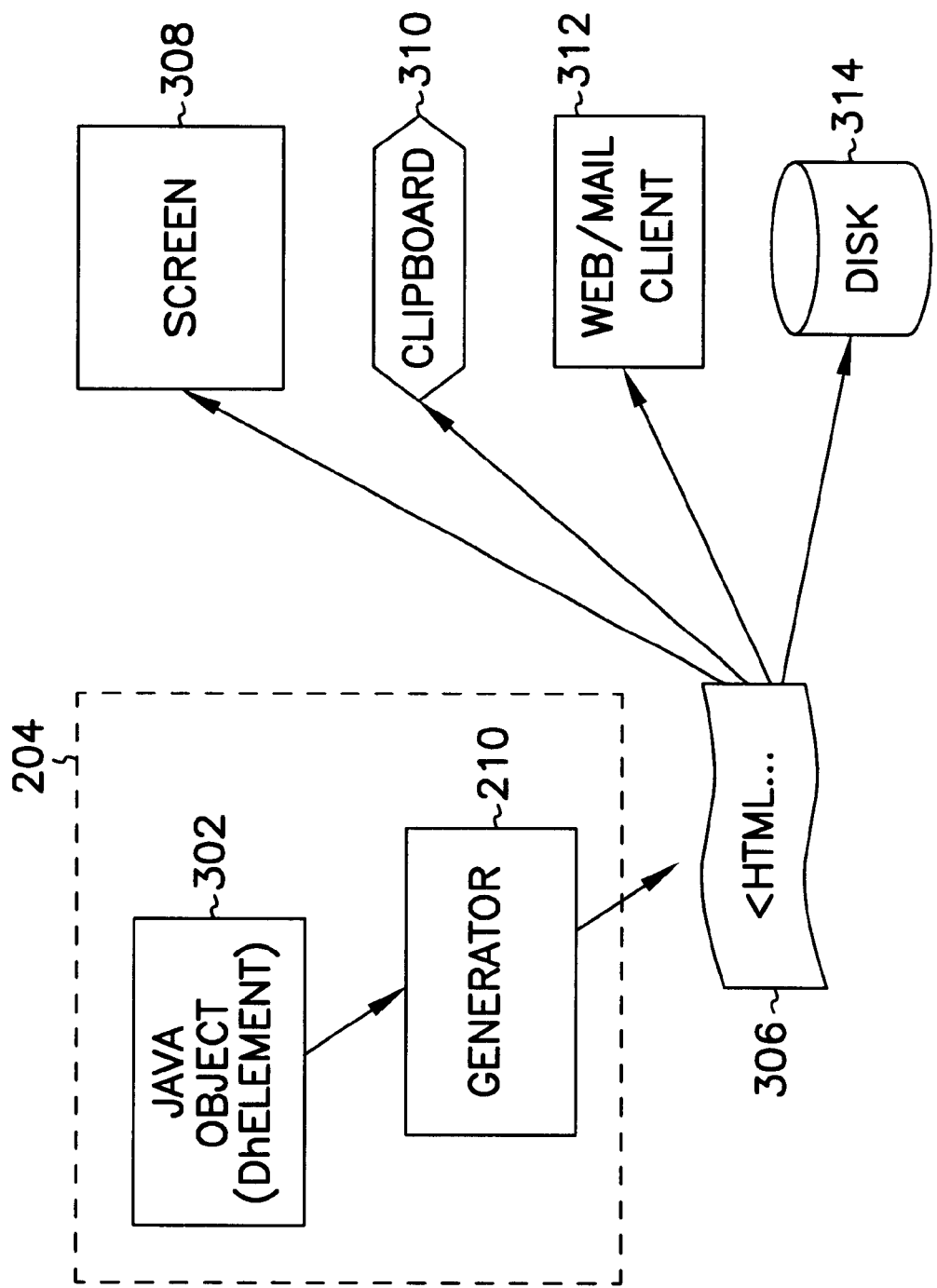
FIG. 3 is a diagram further illustrating the runtime environment and the output of the exemplary embodiment of the invention shown in FIG. 2.

FIG. 3 is a diagram further illustrating the runtime environment 204 and the output 212 of the example embodiment of the invention shown in FIG. 2. In the example embodiment shown in FIG. 3, a Java object 302 exists in memory of a computer during the execution of the byte code 206 at run time. The Java object 302 corresponds to an HTML element. The HTML element is any item or component that appears on a web page. Example HTML elements include buttons, list boxes, check boxes and tables. When the Java object is added to a web document, a generator 210 is called. At that point, an HTML string 306 is generated comprising the tags and text that represent the HTML element.

Generator 210 generates the HTML string 306 for the Java object 302. In one embodiment HTML string 306 comprises tags and text for any common document-layout and hyperlink-specification language. In an example embodiment, the generator 210 generates the HTML string in a form for display by an Internet Explorer version4.0 web browser. In alternate embodiments, the generator 210 generates the HTML string in a form for display by other commonly available browsers such as Netscape Navigator version 3.0. In a further embodiment, the generator 210 generates formatted text other than HTML tags and text.

Generator 210 allows developers to write a single program that dynamically generates a formatted text string for a selected one of a variety of sources. For example, a single program generates a formatted text string to display the text "Hello World" in red bold characters by an Internet Explorer brand web browser and by a Netscape Navigator brand web browser even though the browsers require a different syntax. One version of the Internet Explorer brand web browser requires the following syntax for tags and text:
<span id=myspan style="font-weight:bold;color:red">Hello World</span>.
In contrast, one version of the Netscape Navigator brand web browser requires the following syntax for tags and text:
<B><Font color=red>Hello World</font></b>.
From the same program, generator 210 generates the string of the tags and text with the syntax required by the Internet Explorer brand web browser if that web browser is specified or the Netscape Navigator brand web browser is that web browser is specified. The HTML string 306 is available to any one of a number of mediums such as a screen 308, a clipboard 310, a web/mail client 312 or a disk 314 for example. Screen 308 represents any program for retrieving and displaying files and following links to other files, including any commonly available web browsers such as Internet Explorer and Netscape Navigator. Screen 308 receives and displays an HTML document containing the HTML string 306. Clipboard 310 represents any file or memory area where data is stored temporarily before being copied to another location. Clipboard 310 receives HTML string 306 and makes HTML string 306 available to any applications that recognize text generally or HTML text specifically. For example, HTML string 306 received by clipboard 310 is available to word processors such as Microsoft Word. Web client 312 represents a web client capable of receiving the HTML string 306 from a web server through an HTTP connection. Web mail 312 represents a means of transporting the HTML string 306 as a mail component. Disk 314 is any commonly available storage medium. In an off-line mode of the invention, such as the command shell environment further described below, the HTML string 306 is written to a file on the disk 314.

Figure 4:
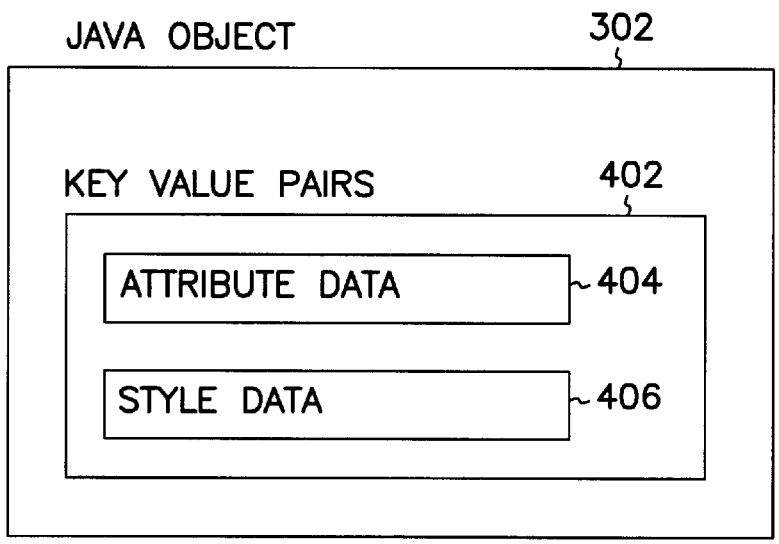
FIG. 4 is a diagram of the Java object shown in FIG. 3.

FIG. 4 is a more detailed diagram of the Java object 302 shown in FIG. 3. Java object 302 comprises an attribute referred to herein as key value pairs 402. The key value pairs 402 are parallel arrays of keys and values. Key value pairs 402 are used to generate styles and attributes for an HTML element. A first array 404 of the key value pair stores data representing attributes for the HTML element. Attributes are qualities that pertain to an HTML element. Attributes have the syntax "name=value" and are space delimited. A second array 406 of the key value pair stores data representing styles for the HTML element. Styles are formatting characteristics that pertain to the HTML element. Styles have the syntax "name:value" and are semicolon delimited. Thus, the key value pairs 402 store information about how the Java developer manipulated a Java object which represents an HTML element. The generator of FIG. 3 uses the data in the key value pairs 402 to generated HTML tailored to a selected one of a variety of different browsers.

The system level overview of the operation of an example embodiment of the invention has been described in this section of the detailed description. The present invention provides software developers who program in object-oriented languages, such as the Java programming language, the ability to translate object-oriented programs into a tag-based display language such as HTML. The tag-based display language generated from a single program can be tailored to a variety of different browsers. In one embodiment, the tag-based display language is tailored for Internet Explorer version 4.0.

Methods of an Exemplary Embodiment of the Invention

In the previous section, a system level overview of the operation of an example embodiment of the invention was described. In this section, the particular methods of such an example embodiment are described by reference to a series of flowcharts, state diagrams and time lines. The methods to be performed constitute computer programs made up of computer-executable instructions. Describing the methods by reference to flowcharts, state diagrams and time lines enables one skilled in the art to develop such programs including such instructions to carry out the methods on suitable computerized systems.

Figure 5:
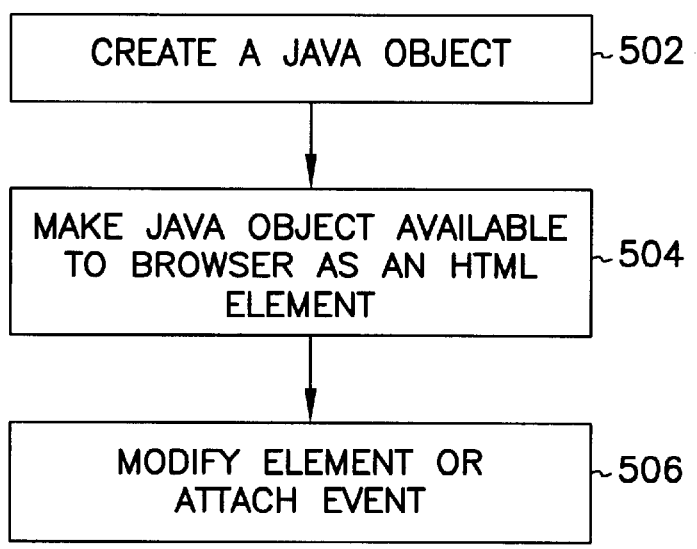
FIG. 5 is a flowchart of a method of generating an HTML element from Java code.

One embodiment of a method of generating an HTML element from Java code is shown in FIG. 5. The method begins when a Java object (block 502) is created by a programmer. Data representing style and attribute information about the Java object is stored in key value pair arrays until the Java object is added to the web browser as an HTML element (block 504). After the object is added to the browser, the HTML element can be directly accessed for modifications or to attach an event (block 506) for example. At any point during the method shown in FIG. 5, the Java object corresponding to a particular HTML element will be in one of three states. The states comprise an "unbound" state, a "peer available" state and a "bound" state. The states and movement between the states is transparent to the programmer.

Figure 6:
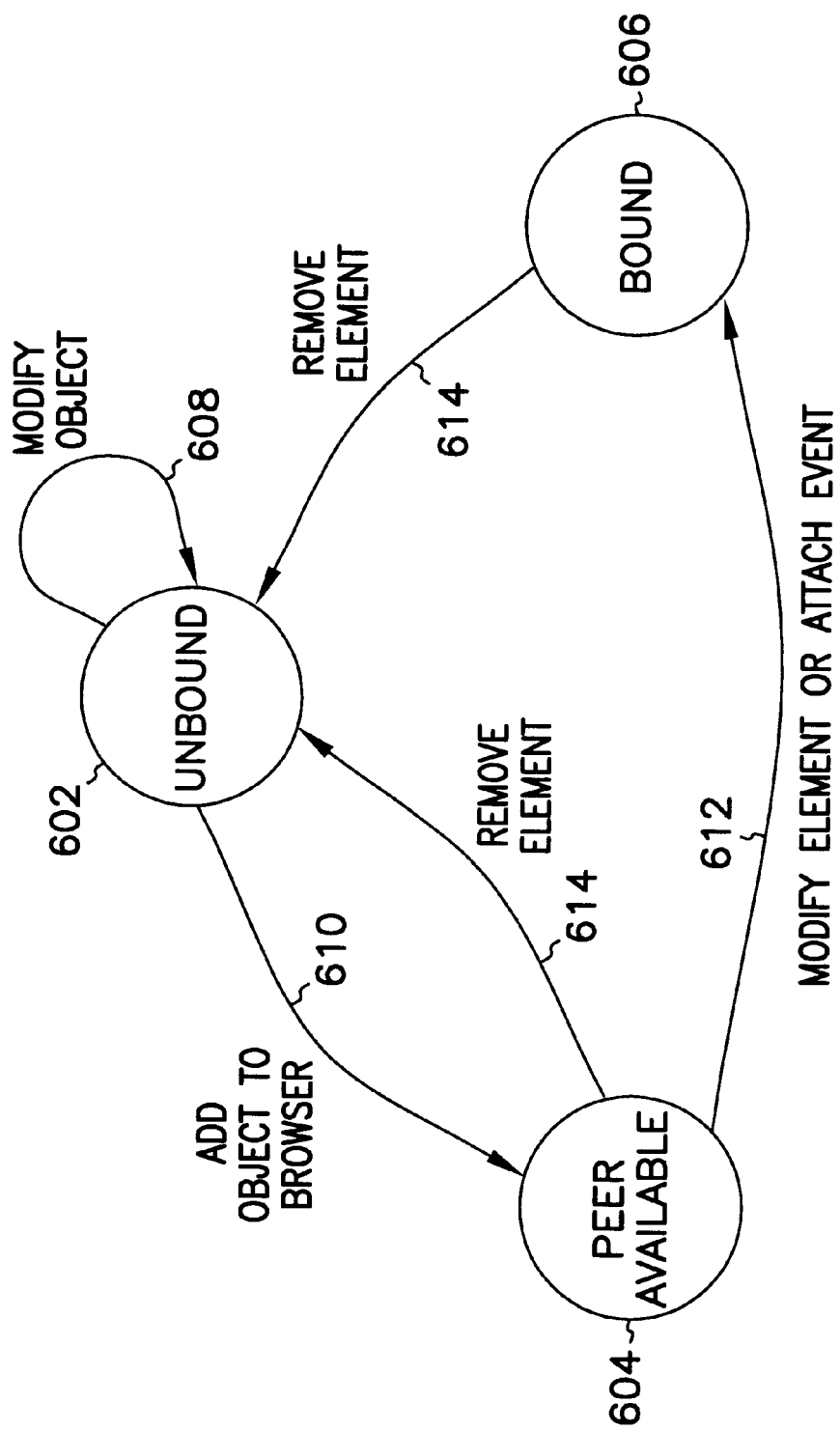
FIG. 6 is a state diagram illustrating three states associated with the Java object of FIG. 4 and actions that cause a transition between the states.

FIG. 6 is a state diagram illustrating the three states and actions that cause a transition between states. The states are represented by circles or nodes in the state diagram. The states are unbound 602, peer available 604 and bound 606.

When a Java object is created, it is in an unbound state 602 and remains unbound until a corresponding HTML element is sent to a browser. While in the unbound state 602, information about the Java object is stored as key value pairs. Modifications to the Java object such as setting or removing attribute information and style information are made without changing the state of the Java object (line 608).

However, when the Java object is added to a browser (line 610), the state of the object is changed to peer available 604. A peer available state indicates that an appropriate HTML scripting object, or "peer", is available inside the browser. In order to add the Java object to the browser, a generator generates an HTML string representing the HTML element. The generator uses the data stored in the key value pairs to generate the applicable HTML string. The Java object will remain in the peer available 604 state until the HTML element is needed such as for binding events, setting properties, or calling methods on the peer (line 612). Leaving the Java object in the peer available state 604 until the peer is needed prevents resource intensive searching that is required to identify or find the browser instance "peer" of the element. Since the Java object may not need to be identified again, leaving it in the peer available state enhances resource utilization and overall performance.

The HTML peer is only retrieved if it is needed. In which case, the peer is retrieved and the state of the Java object is changed to bound 606. The bound state 606 indicates the element is associated with a "peer" inside the browser. During the bound state 606 the KeyValuePairs are no longer maintained for the Java object and any changes in styles or attributes are sent directly to the "peer" on the browser.

Elements are changed from the bound state 606 or from the peer available state 604 to the unbound state 602 when the elements are removed from the document (line 614). If an element is removed from a document, the HTML of the peer element is translated and the data is used to re-build the corresponding Key ValuePair arrays. In an alternate embodiment, elements move from the unbound state 602 directly to the bound state 606. In an additional embodiment, elements are returned from the bound state 606 to the peer available state 604. It is contemplated and within the scope of the invention that elements are capable of moving from any one state to any other state shown in the state diagram of FIG. 6. The states and movement between them are transparent to the programmer.

Figure 7A:
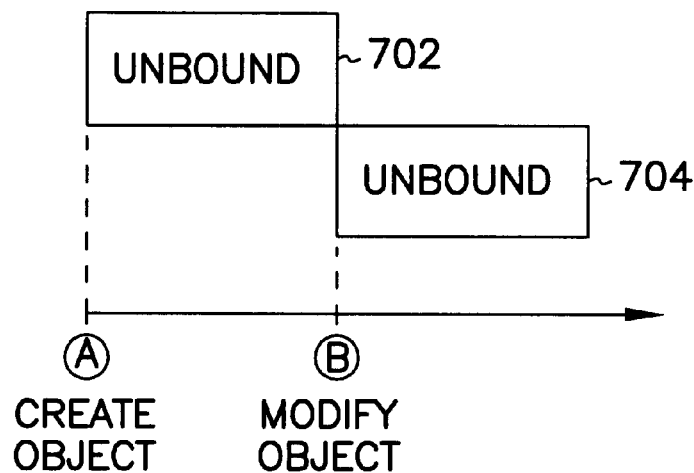
FIGS. 7A, 7B, 7C, and 7D are time lines illustrating example scenarios of the three states shown in FIG. 6 and actions that cause a transition between the states.

FIGS. 7A, 7B, 7C and 7D are time lines illustrating example scenarios of the three states and actions that cause a transition between the states. In FIG. 7A a new Java object is created at point A. The Java object is in the unbound state 702. At point B the Java object is modified. Because the Java object is not available to the browser yet, any modifications to the Java object do not change the state. Thus, after modification of the Java object, the object remains in the unbound state 704. In a web server environment, as further described below, the Java object remains in the unbound state as shown in FIG. 7A.

Figure 7B:
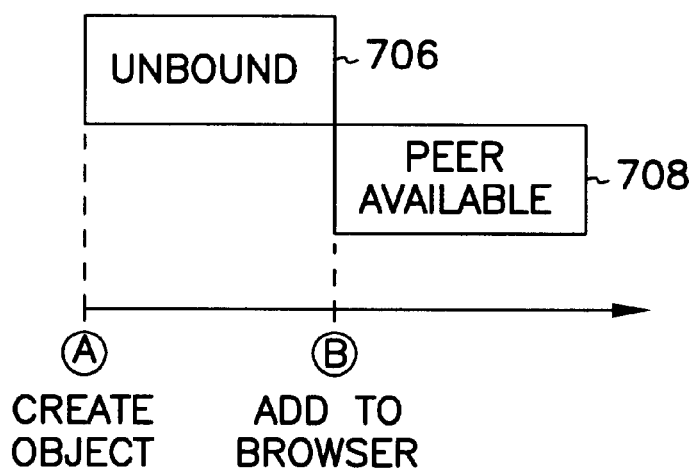

In FIG. 7B a new Java object is created at point A. The Java object is in the unbound state 706. At point B the Java object is added to a browser. Adding the object to the browser changes the state of the object from unbound 706 to peer available 708. If no further manipulations of the Java object occur, the object will remain in the peer available state 708.

Figure 7C:
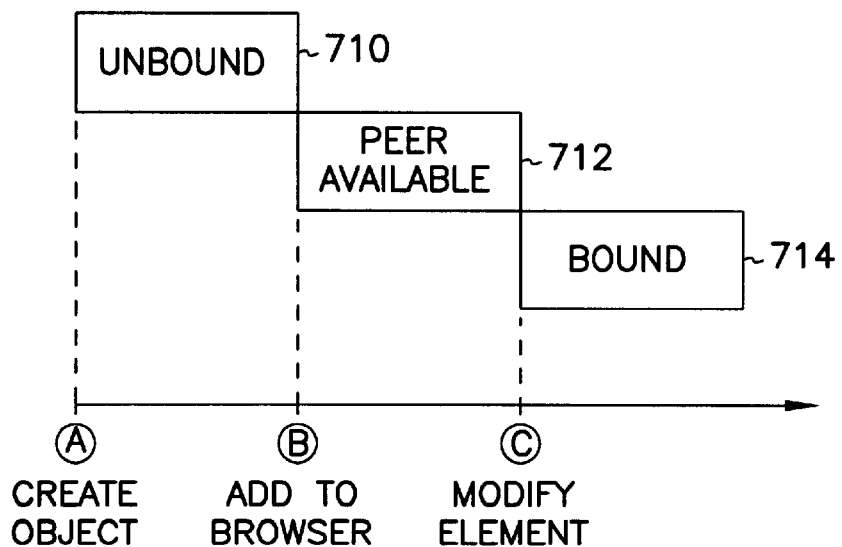

In FIG. 7C a new Java object is created at point A. The Java object is in the unbound state 710. At point B the Java object is added to a browser. Adding the object to the browser changes the state of the object from unbound 710 to peer available 712. At point C the Java object is modified. Because the object is in peer available state 712 and thus available to the browser, the further manipulation of the object changes the state from peer available 712 to bound 714. In the bound state 714 the key value pairs are no longer maintained for the object and any modifications to styles or attributes are sent directly to the peer element on the browser rather than performed on the object. The object will remain in the bound state 714 unless is it removed from the browser.

Figure 7D:
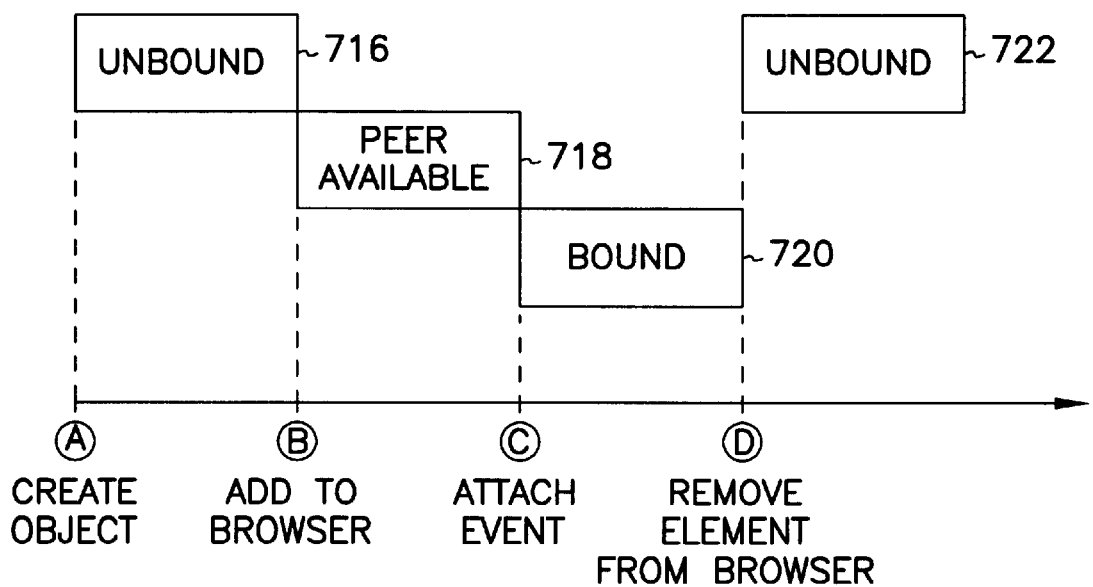

In FIG. 7D a new Java object is created at point A. The Java object is in the unbound state 716. At point B the Java object is added to a browser. Adding the object to the browser changes the state of the object from unbound 716 to peer available 718. At point C an event is attached to the object. Because the Java object is in peer available state 718 and thus available to the browser, the attaching of an event to the object changes the state from peer available 718 to bound 720. The object remains in the bound state 720 until is it removed from the browser at point D. When the object is removed from the browser, the object returns to the unbound state 722. When returning an object to the unbound state 722, the HTML of the peer element is translated and the data is used to rebuild the corresponding key value pair arrays.

The programming model presented to the developer masks the location in the network topology that the Java code is executing. As detailed above the Java code works closely with the browser in the client environment to create an interaction with the user. The Java code will also run in a Web server environment. In this environment the Java code is executed in response to an HTTP URL request from a remote client. The request triggers the Java objects, which start in the "unbound" state, to generate the tag formatted string used as the reply to the client's request. The Java objects then moves into a special-case state called "server-sent" which prevents (through the use of Java runtime exceptions) the developer from changing attributes or styles on the object.

The Java code will also execute in a command shell environment. In the command shell environment the code runs in response to the computer user entering commands into a command window. The Java objects never move past the "unbound" state. The generated tag-formatted text is written to permanent storage in this case (e.g. a hard disk) for another software process to retrieve the text at a later time.

The particular methods performed by an exemplary embodiment of the invention have been described.

Microsoft's com.ms.wfc.html Implementation

In this section of the detailed description, a particular implementation of the invention is described.

Windows Foundation Classes (WFC) are a set of Java class libraries that enable software developers to build Microsoft Windows-based applications with the Java programming language. The com.ms.wfc.html package of the Windows Foundation Classes for Java framework lets a developer access Dynamic HTML (DHTML) on a Web page directly from a Java class.

The HTML package of WFC contains a set of classes that enable developers to generate Dynamic HTML code without having to learn a new language. The HTML class library gives developer's control over the Web page hosting the application. Developers can also change the Web container at run time. Using the HTML Class Library, developers can author Dynamic HTML pages using only the Java Language. The resulting Java application can directly render Dynamic HTML during runtime.

Figure 8:
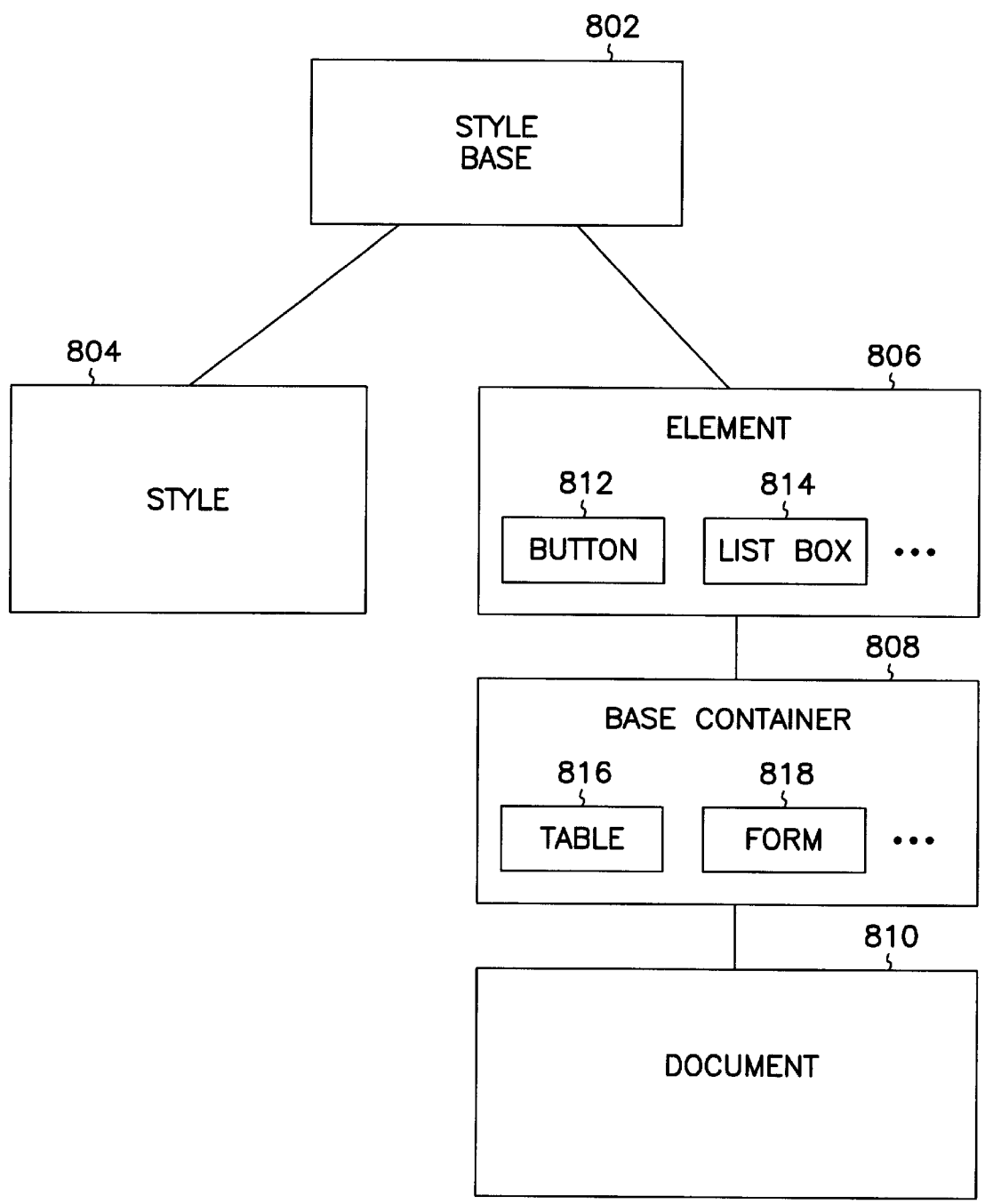
FIG. 8 is a chart illustrating a hierarchy for selected HTML class files of the com.ms.wfc.html implementation.

FIG. 8 is a chart illustrating a hierarchy for selected HTML class files of the com.ms.wfc.html package. In one embodiment, the HTML classes comprise style base 802, style 804, element 806, base container 808 and document 810. Style base 804 is the base class for style 804 and element 806. Element 806 is the base class for base container 808.

At the base of the hierarchy is the style base 802. The style base is an encapsulation of styles. Styles comprise border (including color, style, width), color (including back, fore), cursor, font, margin/padding, text alignment, visible and z-index and the like. Style base 802 has the following attributes: defaultUnit, sized, moved (booleans), styles (KeyValuePairs) and stylePeer.

Key value pairs are parallel arrays of keys and values. Key value pairs are used to generate styles and attributes for an HTML element. A first array of the key value pair stores data representing attributes for the HTML element. Attributes have the syntax "name=value" and are space delimited. A second array of the key value pair stores data representing styles for the HTML element. Styles have the syntax "name:value" and are semicolon delimited.

Style object 804 is derived from style base 802. Style object 804 is a collection of properties. Each time a change is made to the Style object 804 during run time, all elements 806 to which the style object 804 is applied are updated.

Element 806 is derived from style base 802. Button 812 and list box 814 are examples of elements. Element 806 has the following attributes: parent, document, events, closetag (boolean), html_generator, attributes (KeyValuePairs), style, id (string), peer and found (boolean). Each element has a unique id attribute that identifies the element in the document. The html_generator attribute indicates a generator to use when creating the HTML string for the element. In an example embodiment, the html_generator is a generator for HTML recognized by an Internet Explorer web browser version 4.0. An element does not become visible to an end user until the element is added to a browser. Elements 806 can trigger events.

Base container 808 is derived from element 806. Containers are elements that can hold other elements. Base container 808 allows parent-child relationships. A container has an array of elements that are the children of the container. Each one of the elements (which can be other containers) added to the container become children of the container. The elements do not become part of a document (and thus available to the browser) until the topmost container which is not part of any other container is added to the document.

In one embodiment, when children are added to a container, the state of the container is checked. If the state of the container is "unbound", then the children are placed in the array for that container and the operation is complete. However, if the state of the container is "bound" or "peer available", in addition to placing the children in the array for the container, the children must be made available to the browser. The children become either "bound" or "Peer Available". HTML is generated for the children and the HTML is inserted into the browser at that point.

The following example illustrates using the com.ms.wfc.html package to implement Java and DHTML. The following example illustrates building a simple DHTML page using the Java programming language. The Java programming language is known in the art. Information regarding Java is described in the reference by David Flanagan, "Java in a Nutshell: A Desktop Quick Reference," 2d edition, 1997 (ISBN 1-56592-262-X), which is hereby incorporated by reference.

In accordance with one embodiment, a developer extends the DhDocument class. The DhDocument-derived class is instantiated by a DhModule class that is placed in the HTML stream. The DhModuleclass ensures that a Java object can connect to an HTML document container. The HTML container refers to a documentLoad method as the entry point into the Java object. Once the documentLoad method is called by the HTML container, the DhDocument class enables a Java developer to manipulate a HTML page, and its contents.

Conclusion

The present invention provides software developers who program in Java the ability to translate Java programs into a tag-based display language such as HTML. The tag-based display language generated from a single Java program can be tailored to a variety of different browsers. In one embodiment, the tag-based display language is tailored for Internet Explorer version 4.0.

In other embodiments, other object-oriented programs may be similarly converted to a desired tag-based procedural programming language or script. In an object-oriented programming environment, it is a simple matter to write programs which can be easily "plugged in" as desired to perform specialized conversions. Programs written in C++, Java, Smalltalk and others can be converted to any tag-based format, such as DHTML, HTML and XML for dynamic display and storage. Additional or varied states may also be employed without departing from the invention.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

We claim:

1. A method of generating tag-based code from an object-oriented program, the method comprising:

executing the object oriented program;

creating an object representing an element in a tag-based display language, wherein the object is created by the object-oriented program and comprises a key value pair representing at least one attribute for the object and one style for the object;

monitoring the state of the object; and updating the state of the object upon an occurrence of an event that moves the object to a different one of the states; and maintaining at least three states, each one of the states indicating if the object is available on a browser;

monitoring the state of the object; and updating the state of the object upon an occurrence of an event that moves the object to a different one of the states; and generating a string of code in the tag-based display language from the object wherein the string is formatted for a particular browser.

2. The method of claim 1, wherein the tag-based display language is HTML.

3. The method of claim 1, wherein the tag-based display language is Dynamic HTML.

4. The method of claim 1, wherein the tag-based display language is XML.

5. The method of claim 1, wherein the particular browser is an Internet Explorer brand web browser.

6. A computer readable medium having computer-executable instructions for performing the actions recited in claim 1.

* * * * *

UNITED STATES PATENT AND TRADEMARK OFFICE
CERTIFICATE OF CORRECTION

PATENT NO.   : 6,504,554 B1
DATED        : January 7, 2003
INVENTOR(S)  : Victor A. Stone et al.

It is certified that error appears in the above-identified patent and that said Letters Patent is hereby corrected as shown below:

Column 3,
Line 50, delete "include" and insert -- includes -- therefor;

Column 5,
Line 60, delete "version4.0" and insert -- version 4.0 -- therefor;

Column 9,
Line 42, delete the first occurrence of "804" and insert -- 802 -- therefor;

Column 10,
Lines 31-32, delete "com-.ms.wfc.html" and insert -- com.ms.wfc.html -- therefor.

Signed and Sealed this

Twenty-ninth Day of July, 2003

JAMES E. ROGAN
*Director of the United States Patent and Trademark Office*